Figure 1:
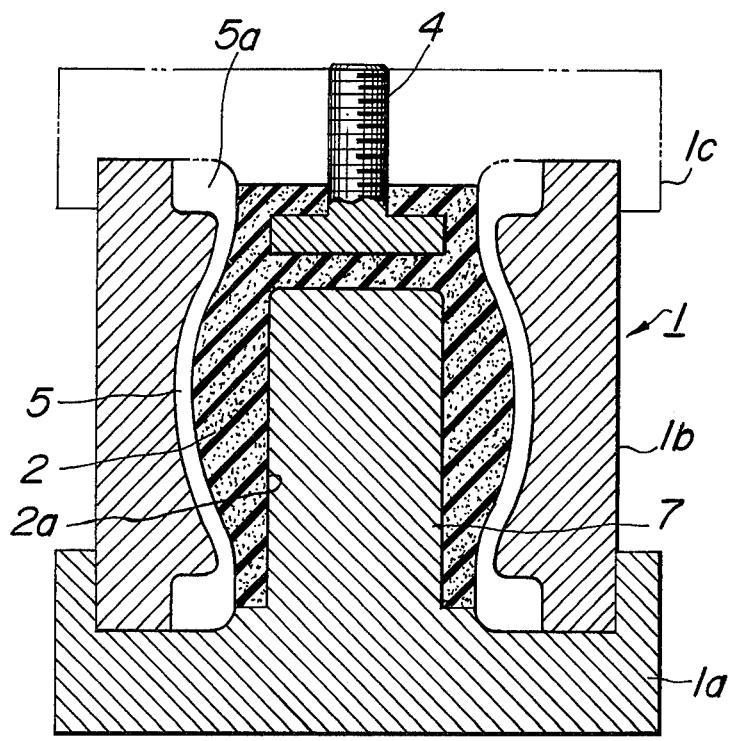

United States Patent [19]

Takahashi et al.

[11] 4,101,626
[45] Jul. 18, 1978

[54] METHOD FOR MOLDING AN ARTICLE EXPANDED AT THE CENTER PORTION AND HAVING THE MAXIMUM INNER DIAMETER AT SAID PORTION FOR A LIQUID ELASTOMER

[75] Inventors: Takuya Takahashi, Odawara; Masashi Ishigami, Yokohama, both of Japan

[73] Assignee: Bridgestone Tire Company Limited, Tokyo, Japan

[21] Appl. No.: 770,175

[22] Filed: Feb. 18, 1977

Related U.S. Application Data

[63] Continuation-in-part of Ser. No. 603,981, Aug. 12, 1975, abandoned.

[30] Foreign Application Priority Data

Aug. 24, 1974 [JP] Japan .................................. 49-96639

[51] Int. Cl.$^2$ ............................................. B29C 1/12
[52] U.S. Cl. ..................................... 264/313; 249/177;
249/183; 264/318; 264/334; 425/440; 425/DIG. 58
[58] Field of Search ............... 264/318, 313, 334, 336; 425/440, DIG. 58; 249/177, 183

[56] References Cited

U.S. PATENT DOCUMENTS

| | | | |
|---|---|---|---|
| 2,779,676 | 1/1957 | Brownstein | 249/183 X |
| 3,157,934 | 11/1964 | Williams | 249/183 |
| 3,158,906 | 12/1964 | Boyer | 249/183 X |
| 3,720,746 | 3/1973 | Schwenk | 264/318 X |

*Primary Examiner*—Thomas P. Pavelko
*Attorney, Agent, or Firm*—Sughrue, Rothwell, Mion, Zinn and Macpeak

[57] ABSTRACT

An article expanded at the center portion and having the maximum diameter at said portion, for example a ball-shaped flexible tube joint, is produced by using a mold consisting of a main mold having the same inner surface as the outer shape of said article, a cover mold provided with an elastic core having the same outer shape as the inner shape of the above described article and provided with a hollow cavity in the inside of the core, and a bottom mold provided with a projection, which detachably fits in the hollow cavity in the core, the main mold being put between the cover mold and the bottom mold, and a cavity having the same shape as the article to be molded being formed by the cover mold, the elastic core, the main mold and the bottom mold, and by pouring a liquid elastomer into the thus formed cavity and hardening said liquid elastomer.

6 Claims, 3 Drawing Figures

FIG_2

METHOD FOR MOLDING AN ARTICLE EXPANDED AT THE CENTER PORTION AND HAVING THE MAXIMUM INNER DIAMETER AT SAID PORTION FOR A LIQUID ELASTOMER

RELATED APPLICATIONS

This is a continuation-in-part of Ser. No. 603,981 filed Aug. 12, 1975 and now abandoned.

The present invention relates to a method for molding an article expanded at the center portion and having the maximum inner diameter at said portion, for example a ball-shaped flexible tube joint, from a liquid elastomer.

In the case where a hollow cylindrical article is generally molded from a liquid elastomer, a cavity for feeding the liquid elastomer is usually defined with a metal outer mold and coupling metal core and the liquid elastomer is poured into the cavity and said elastomer is hardened, after which the core is pulled out from the outer mold. However, when an article expanded at the center portion and having the maximum inner diameter at said portion is produced, the cavity cannot be defined unless a specific device is made at the outer mold or the core and even if the cavity is defined, since the maximum diameter of the core is larger than the diameter at the end portion of the outer mold, it is impossible to take out the core as such from the outer mold.

The present invention has been developed for solving the above described defects and consists in a method for molding an article expanded at the center portion and having the maximum inner diameter at said portion, for example a ball-shaped flexible tube joint, which comprises constituting a mold consisting of a cover mold which can be threadedly engaged with or inserted by an upwardly tapered female screw member engaged with, a crew rod provided in an elastic core having the same outer shape as the inner shape of the above described article having the maximum diameter at the expanded portion and provided with a column-shaped hollow portion or a conical trapezium hollow portion and extending to at least the position of the article which has the maximum diameter, from the top end of the core, a main mold having the same shaped inner surface as the outer shape of the article expanded at the center portion and a bottom mold provided with a projection detachably fitting in the above described hollow portion in the core, the assembling of the cover mold, the elastic core, the main mold and the bottom mold constituting a cavity corresponding to the shape of the article to be shaped, before setting the cover mold, pouring a liquid elastomer into the thus constituted cavity to fully fill the cavity, setting the cover mold on the main mold, hardening the poured elastomer, after which pulling out the bottom mold together with the projection fitted in the above described hollow portion in the core, taking off the cover mold from the core, pulling out the core from the main mold while contracting the elastic core so as to be cured into the hollow portion in the core and pulling out the shaped article having the maximum diameter at the center portion.

The elastic core is preferred to be a foamed elastic body having a specific gravity of 0.1–0.7 and among them a foamed polyurethane is preferable. The surface of the core formed of the foamed polyurethane having such a degree of density is relatively smooth but when the surface becomes coarse owing to the pores of the foamed body, an appropriate coating may be applied. In this case, the coating may be utilized for adjusting the whole hardness of the core.

The liquid elastomer to be used in the present invention is preferred to be a liquid polyurethane and in addition, a liquid polybutadiene and so on may be used.

The characteristic of the present invention can be realized by constituting the core with the elastomer and forming the above described hollow portion in the core.

When the liquid elastomer is poured into the cavity formed by the cover mold, the main mold, the core and the bottom mold and the poured liquid elastomer is hardened, the form of said cavity is maintained and the elastic core can endure the pressure generated upon hardening of the elastomer by the projection provided on the bottom mold and inserted into the hollow portion of the core. Then, when the hardened shaped article is to be taken out, firstly the inserted projection is pulled out from the hollow portion of the core and the cover mold provided with the core is taken up to deform and curve the core towards the hollow portion and pull out the core through the end portion of the main mold having a small diameter than the maximum diameter of the core, after which the shaped article is taken out from the main mold. Accordingly, it is essential that the hollow portion provided from the top end of the core is a vertical column or a conical trapezium, the top end of which is narrow, in the side wall and by such a constitution, the insertion and pulling out of the projection becomes feasible.

Furthermore, it is essential that the hollow portion in the core has such a depth that the hollow portion extends to at least the position of the core having the maximum diameter and therefore the portion of the core having the maximum diameter can be deformed and curved into the hollow portion provided in the inner portion of the core, so that the core can be pulled out from the main mold.

Figure 2:
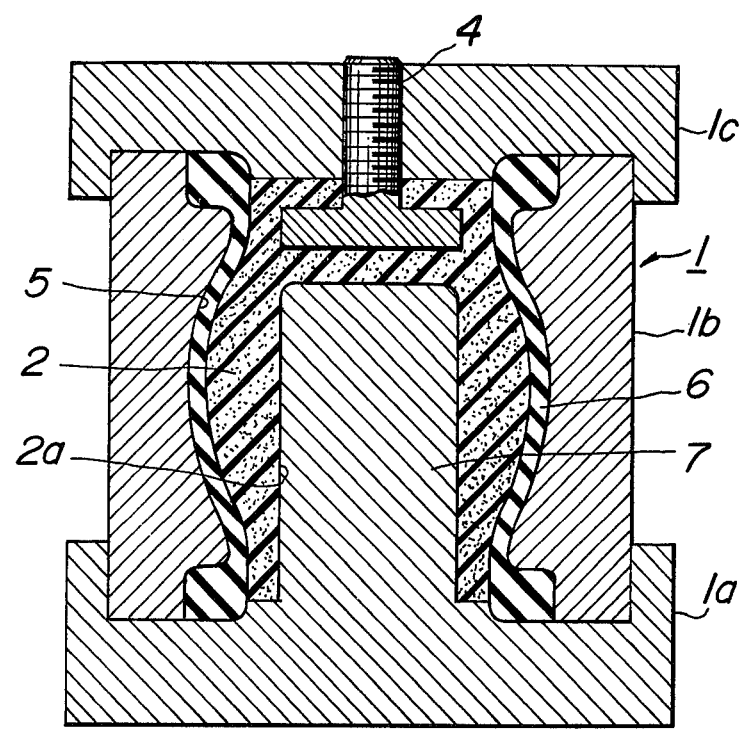

The present invention will be explained in more detail with reference to the accompanying drawings, wherein FIGS. 1 and 2 are the vertical cross-sectional views of the mold for shaping a liquid elastomer according to the present invention showing the status before and after the liquid elastomer is poured in the cavity, respectively.

Figure 3:
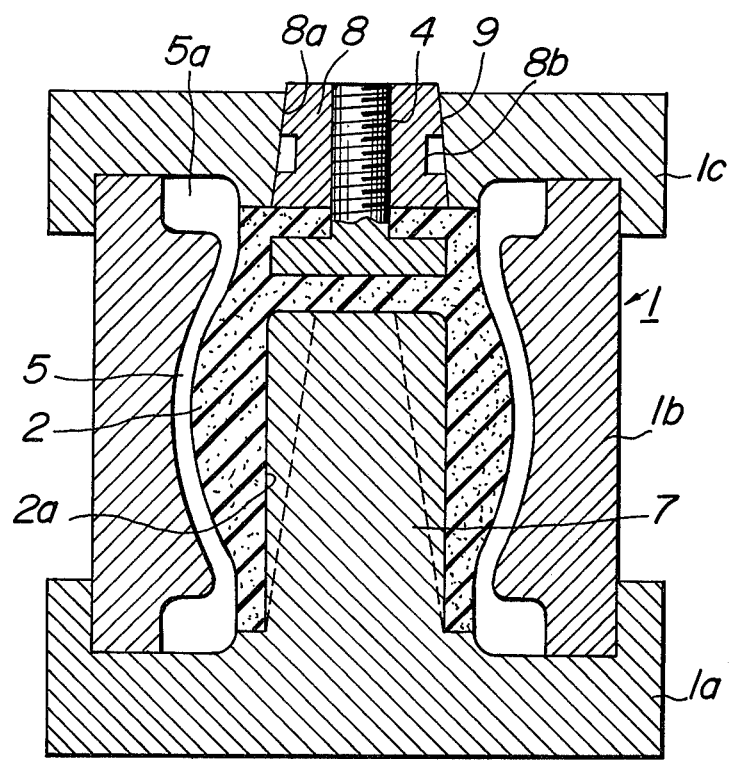

FIG. 3 is the vertical cross-sectional view of another embodiment of the mold for shaping a liquid elastomer according to the present invention.

Referring to FIG. 1, 1 shows the whole mold and consists of a bottom mold 1a, a main mold 1b and a cover mold 1c.

FIGS. 1–3 show embodiments when a ball-shaped flexible tube joint is produced through the molding method of the present invention. 2 is an elastic core made of a formed polyurethane, has the same outer shape as the inner shape of the article to be shaped which has the maximum diameter at the center portion, and is provided with a column-shaped hollow portion 7 or a conical trapezium hollow portion. A base of a screw rod 4 projecting outwardly to be threadedly engaged with the cover mold 1c is embedded and fixed in the end portion in the axial direction of the core 2. In a preferred embodiment, an upwardly tapered female screw member 8 in FIG. 3, which is the threadedly engaged with the screw rod 4, is provided and two notches 8b are provided at the symmetric positions of the tapered side walls 8a of the screw member 8.

1c is a cover mold and at the center portion there is provided female screw threads to be threadedly engaged with the screw rod 4 of the core or an opening 9 to be fitted to the upwardly tapered female screw member 8 to be threadedly engaged with the screw rod 4 is provided.

1b is a main mold and has the inner surface having the same shape as the outer shape of the expanded article to be shaped and is provided between the cover mold and the bottom mold explained hereinafter. This main mold may be integrally constituted but when the main mold is constituted with at least two members, which are integrated with bolts and the like, the handling is convenient.

1a is a bottom mold and is provided with a projection to be fitted to the hollow portion 7 of the core 2 at the center portion and the projected edge to firmly hold the main mold 16.

An explanation will be made with respect to the step for shaping a hollow article, such as a ball-shaped flexible joint by means of the above described molds.

Firstly, the elastic core 2 is inserted in the main mold 16 and then the projection 7 of the bottom mold 1c is fitted on the hollow portion 7 of the core 2 and the main mold 1b is held by the projected edge of the bottom mold 1a. A liquid elastomer is poured into an opening 5a of a cavity 5 formed by the main mold 1b, the core 2 and the bottom mold 1a until the cavity if fully filled with the liquid elastomer, after which the female threads in the cover mold 1c is threadedly engaged with the screw rod 4 of the core 2 or the opening 9 in the cover mold 1c is fitted in the upwardly tapered female screw member 8 and the cover mold 1c is set on the main mold 1b, whereby the liquid elastomer supplied in a slightly excess amount is overflowed resulting into the status as shown in FIG. 2. Then, the liquid elastomer is hardened with a proper treatment, for example heating.

The process for taking out the shaped article 6 is as follows. Firstly, the bottom mold 1a is pulled out from the mold 1. Then, in FIG. 2, the cover mold 1c is removed from the screw rod 4 of the core 2 and then a proper tool is filled on the screw rod 4 and said tool is pulled up, whereby the elastic core is inwardly contracted due to the presence of the hollow portion 2a and pulled out from the opening end of a narrow diameter of the shaped article 6. Thereafter, the shaped article 6 is taken out from the main mold 1b. The depth of the follow portion 7 must reach more deep than the maximum diameter portion of the core 2.

The above described projection 7 may be formed integrally with the bottom mold 1a or by fixing a separate part. And, on the whole surface of the cavity 5 is previously applied a releasing agent.

As mentioned above, the present invention relates to a method for molding the article expanded at the center portion and having the maximum diameter at said portion and the precise cavity is not only formed owing to the effective combination of the elastic core provided on the cover mold and the projection provided on the bottom mold, but also the discharge of the core after molding is very easily conducted, because the core can be inwardly contracted owing to the presence of the side wall 2a and there are formed no fins at the hollow portion of the shaped article 6 where the removal of fins is troublesome and the workability is very improved. Furthermore, the manufacture of the core per se is easy and inexpensive.

What is claimed is:

1. A method for molding an article expanded at the center portion and having the maximum inner diameter from a liquid elastomer, comprising; constituting a mold having a cover mold threadedly engaged with an upwardly tapered female screw member, a screw rod provided in the bottom end of an elastic core having the same outer shape as the inner shape of the article with the maximum diameter of the core at the expanded portion of the article provided with a hollow portion extending to at least the position of the article which has the maximum diameter, from the top end of the core, a main mold having the same shaped inner surface as the outer shape of the article expanded at the center portion and a bottom mold provided with a projection detachably fitting in the above described hollow portion in the core; assembling of the cover mold, the elastic core, the main mold and the bottom mold including inserting the porjection into the hollow portion of the core constituting a cavity corresponding to the shape of the article to be shaped, before setting the cover mold; pouring a liquid elastomer into the constituted cavity to fully fill the cavity; setting the cover mold on the main mold; hardening the poured elastomer; pulling out the bottom mold together with the projection fitted in the hollow portion in the core; removing the cover mold from the core; pulling out the core from the main mold by elastic deformation of the elastic core so as to be deformed into the hollow portion in the core and, pulling out the shaped article having the maximum diameter at the center portion.

2. A method as claimed in claim 1, wherein the elastic core is a foamed elastomer having a specific gravity of 0.1-0.7.

3. A method as claimed in claim 2, wherein the elastic core is a foamed polyurethane.

4. The method of claim 1 wherein said hollow portion of said core is column-shaped.

5. The method of claim 1 wherein said hollow portion of said core is a conical trapezium.

6. The method of claim 1 wherein said cover mold has inserted therein said upwardly tapered female screw member.

* * * * *